(12) United States Patent
Redler et al.

(10) Patent No.: US 7,333,019 B2
(45) Date of Patent: Feb. 19, 2008

(54) ADAPTER FOR TAG AND DOCKING STATION

(75) Inventors: Timothy R. Redler, Campbell, CA (US); Nikola Cargonja, San Carlos, CA (US); Steven J. Farrell, Sunnyvale, CA (US)

(73) Assignee: Savi Technology, Inc., Mountain View, CA (US)

( * ) Notice: Subject to any disclaimer, the term of this patent is extended or adjusted under 35 U.S.C. 154(b) by 192 days.

(21) Appl. No.: 11/129,812

(22) Filed: May 16, 2005

(65) Prior Publication Data

US 2006/0255944 A1 Nov. 16, 2006

(51) Int. Cl.
*G08B 13/14* (2006.01)

(52) U.S. Cl. .................................. 340/572.8; 361/733

(58) Field of Classification Search ............. 340/572.1, 340/572.7, 572.8, 10.51, 10.52, 572.7–8, 340/10.51–52; 235/435–436, 439, 441–443, 235/492; 361/683, 686, 731, 733, 369, 740, 361/747
See application file for complete search history.

(56) References Cited

U.S. PATENT DOCUMENTS

2005/0109841 A1* 5/2005 Ryan et al. ................. 235/380

* cited by examiner

*Primary Examiner*—Jeffery Hofsass
*Assistant Examiner*—Hongmin Fan
(74) *Attorney, Agent, or Firm*—Haynes and Boone, LLP

(57) ABSTRACT

An adapter has a cradle portion that can removably receive a radio frequency identification tag. A first electrical connector is positioned in the cradle portion so that, when a tag is removably received in the cradle portion, the first electrical connector electrically couples the adapter to the tag. A second electrical connector is disposed on the adapter at a location spaced from the cradle portion, and the adapter includes structure that electrically couples the first and second electrical connectors.

17 Claims, 5 Drawing Sheets

ADAPTER FOR TAG AND DOCKING STATION

FIELD OF THE INVENTION

This invention relates in general to radio frequency identification (RFID) technology and, more particularly, to equipment that can communicate with an RFID tag but without using wireless signals.

BACKGROUND

One known application for radio frequency identification (RFID) technology is to track a mobile object, such as a shipping container. A device known as a "tag" is provided on the object to be tracked. The tag typically includes circuitry coupled to an antenna, and a battery to power the circuitry. The tag can transmit radio signals, and some tags can also receive radio signals.

During normal operation, communication with a tag is carried out using wireless signals. However, when programming or setting up a tag, it can be more efficient to communicate with the tag through wires, rather than through wireless signals. Accordingly, it is known to provide a docking station that is coupled to a computer through a cable. The tag is inserted into the docking station in order facilitate communication between the computer and the tag, without the use of wireless signals.

Where a customer has purchased a group of tags and a compatible docking station, the customer may wish to be able to use the docking station with newer-generation tags that may eventually be developed at a future time, so that the customer does not have to incur the expense of separately buying a new docking station for the newer-generation tags. On the other hand, design considerations that optimize the newer-generation tags may cause those tags to be physically and/or electrically incompatible with a pre-existing docking station.

SUMMARY OF THE INVENTION

One of the broader forms of the invention involves an apparatus that includes an adapter having: a cradle portion that can removably receive a radio frequency identification tag; a first electrical connector positioned in the cradle portion so that, when a tag is removably received in the cradle portion, the first electrical connector electrically couples the adapter to the tag; a second electrical connector disposed on the adapter at a location spaced from the cradle portion; and structure electrically coupling the first and second electrical connectors.

BRIEF DESCRIPTION OF THE DRAWINGS

A better understanding of the present invention will be realized from the detailed description that follows, taken in conjunction with the accompanying drawings, in which.

DETAILED DESCRIPTION

Figure 1:
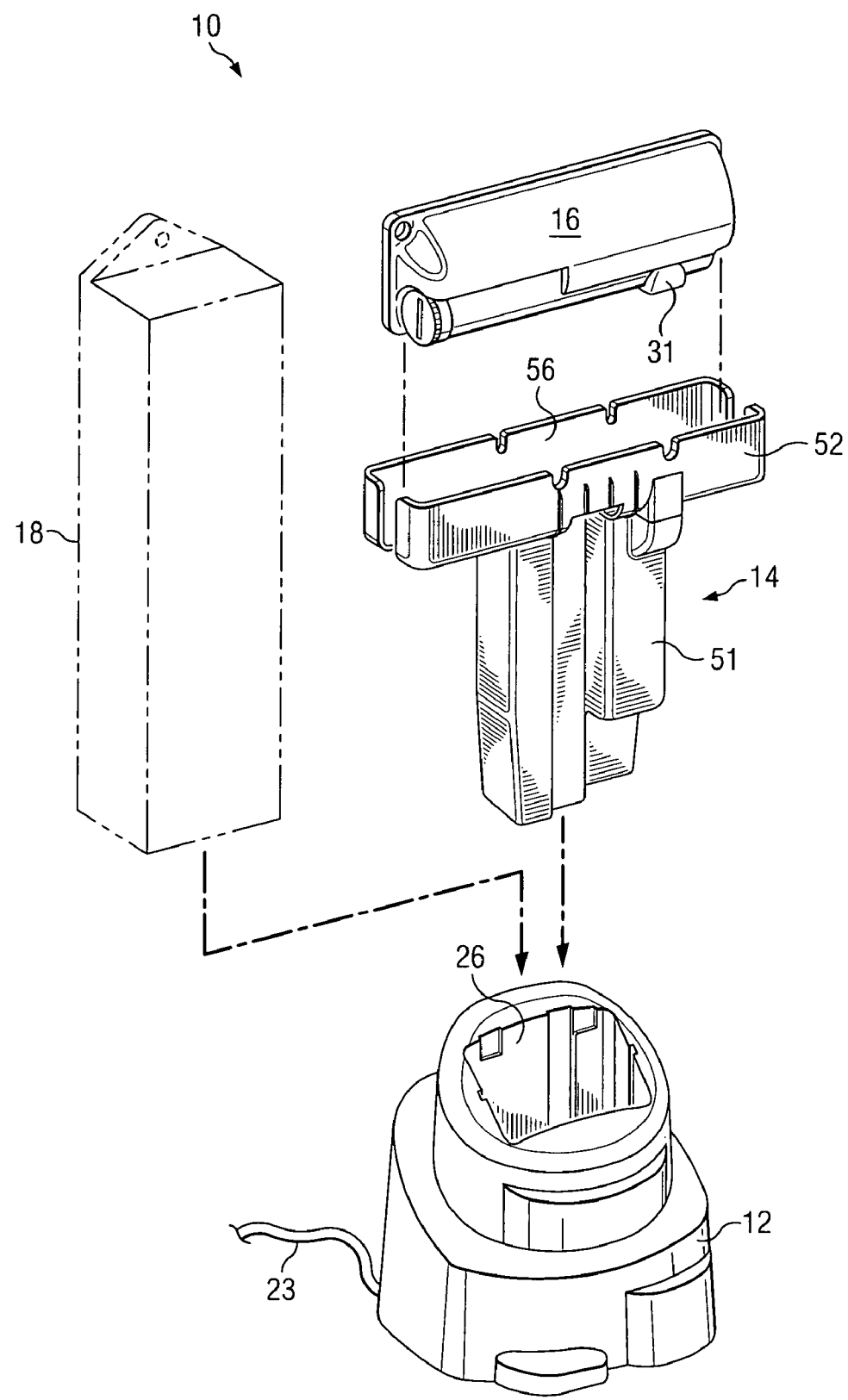
FIG. 1 is a diagrammatic perspective view of an apparatus that includes a docking station, a docking station adapter, and two radio frequency identification tags, one of which is depicted in broken lines.

FIG. 1 is a diagrammatic perspective view of an apparatus 10 that includes a docking station 12, a docking station adapter 14, a radio frequency identification (RFID) tag 16, and a second RFID tag 18 that is depicted in broken lines. The tags 16 and 18 each have a housing, and have circuitry and an antenna disposed within the housing. The circuitry can transmit and/or receive radio frequency signals through the antenna.

The docking station 12 is a device of a known type, and is therefore described here only briefly, to an extent that facilitates an understanding of the present invention. The docking station 12 is coupled through a cable 23 to a non-illustrated computer of a known type. The docking station 12 has a recess 26 that extends downwardly into the docking station from a top surface thereof. The recess 26 is approximately rectangular in cross section. An electrical connector is provided within the recess 26, but is not visible in FIG. 1. The electrical connector is coupled through the cable 23 to the not-illustrated computer. The electrical connector has a known configuration, including three electrical contacts. Each contact includes an elongate vertical metal pin that is supported for reciprocal vertical movement, and that is resiliently biased in an upward direction by a spring.

The docking station 12 of FIG. 1 is configured for use with the tag 18. The tag 18 is a device of a known type, and is therefore described here only briefly, to an extent that facilitates an understanding of the present invention. The cross-sectional shape of the tag 18 is approximately rectangular, and is similar in size to the approximately rectangular recess 26. The lower end portion of the tag 18 can be inserted vertically downwardly into the recess 26. The tag 18 has near its lower end an electrical connector that is not visible in FIG. 1. This electrical connector includes three spaced stationary contacts that are electrically conductive, and that are coupled to the circuitry within the tag 18.

As the tag 18 is inserted into the recess 26, each of the three contacts on the tag engages a respective one of the three resiliently biased pins of the electrical connector within the recess 26. As the tag 18 continues moving downwardly to its fully-inserted position, the contacts on the tag push the pins down a short distance against the urging of the springs. The springs resiliently urge the pins against the contacts, thereby ensuring good electrical contact between the contacts and the pins. In this manner, the circuitry within the tag 18 is electrically coupled to the docking station 12. The not-illustrated computer can then communicate electrically through cable 23 and docking station 12 with the circuitry inside the tag 18, without using any wireless signals.

The tag 16 was designed at a point in time after the tag 18 and docking station 12 had been commercially sold and used. The tag 16 has a portion 31 that contains an electrical connector with three stationary metal contacts. These contacts are electrically coupled to the circuitry within the tag 16. Customers who have purchased the docking station 12 and the tag 18 may later decide to purchase the tag 16, and would prefer to be able to use the tag 16 with the docking station 12 that they already own. However, it is not possible to insert the tag 16 into the recess 26 with any orientation where the electrical connector in the portion 31 of the tag 16 will mate with the electrical connector disposed near the bottom of the recess 26. Moreover, as will become evident from the discussion that follows, the stationary contacts in the electrical connector of the tag 16 have a layout that is different from the layout of the pins of the electrical connector in the recess 26. Therefore, in order to permit the tag 16 to be easily and conveniently coupled to the docking station 12, the docking station adapter 14 is provided.

In the disclosed embodiment, the docking station adapter 14 is an approximately T-shaped device. In particular, it has a housing that includes an approximately vertical stem 51, and a horizontally-extending cross part 52 that is secured to the upper end of the stem 51. Although the disclosed adapter 14 has a T-shape, it would alternatively be possible for the adapter to have some other shape.

The housing of the adapter 14 is made from a high-impact plastic material that is rigid and durable. A variety of suitable plastics and other materials are known to persons skilled in the art. The stem 51 can be removably inserted downwardly into the recess 26 in the docking station 12. The cross-sectional shape and dimensions of the stem 51 are selected so that, when the stem 51 has been inserted into the recess 26, there will be little or no play or tilting of the adapter 14 in relation to the docking station 12. As mentioned earlier, the docking station 12 has an electrical connector near the lower end of the recess 26. This electrical connector cooperates with an electrical connector provided on the stem 51 of the adapter 14. The electrical connector on the stem 51 is not visible in FIG. 1, but will be described in more detail later.

The cross part 52 of the adapter 14 has an upwardly open recess 56 that is sized to snugly receive the tag 16, when the tag 16 has the orientation shown in FIG. 1. The recess 56 effectively serves as a cradle for the tag 16. The adapter 14 has an electrical connector disposed within the recess 56, This connector is not visible in FIG. 1, but will be described in more detail later. When the tag 16 is inserted into the recess 56, the electrical connector in the recess 56 engages the electrical connector in the portion 31 of the tag 16, as discussed in more detail later.

Figure 2:
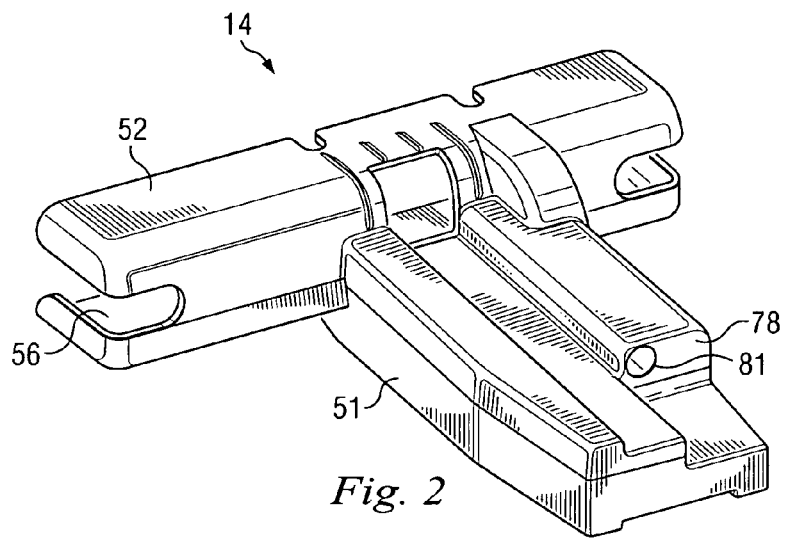
FIG. 2 is a diagrammatic perspective view of the docking station adapter of FIG. 1, taken in a direction different from that shown in FIG. 1.
Figure 3:
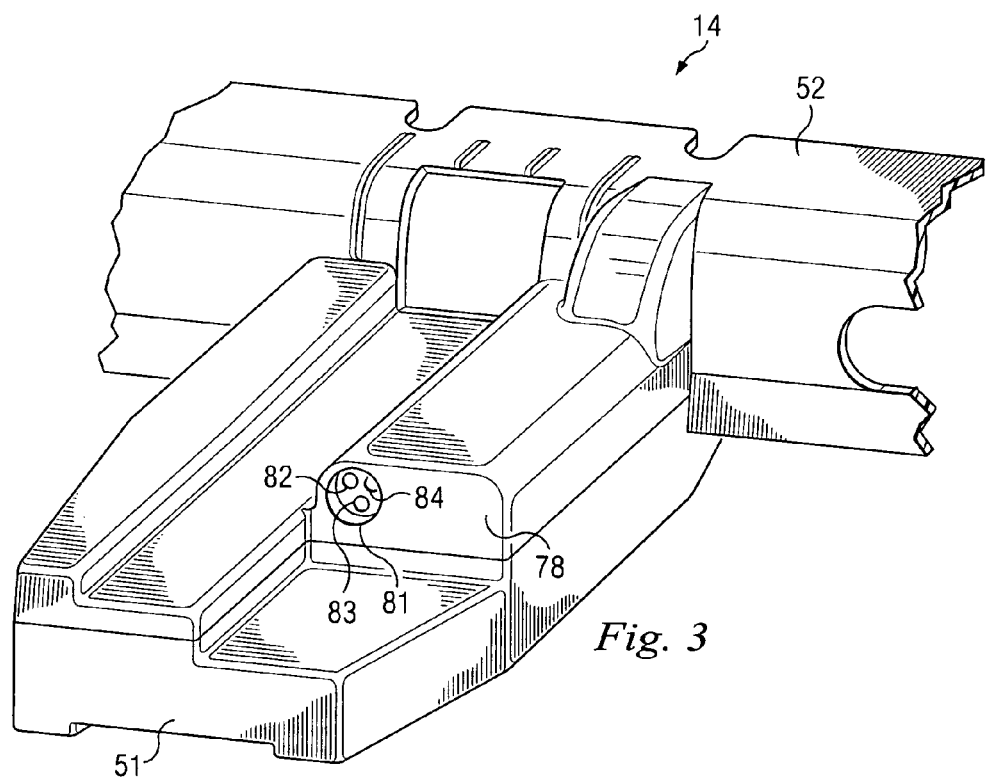
FIG. 3 is a diagrammatic fragmentary perspective view of the docking station adapter, taken in yet another direction.

FIG. 2 is a diagrammatic perspective view of the docking station adapter 14, taken in a direction different from that shown in FIG. 1. FIG. 3 is a diagrammatic fragmentary perspective view of the adapter 14, taken in yet another direction. As shown in FIGS. 2 and 3, the stem 51 of the adapter 14 has a downwardly facing surface 78, which is spaced a short distance upwardly from the bottom end of the stem 51. An approximately cylindrical recess 81 extends upwardly into the stem 51 from the surface 78. As beet seen in FIG. 3, the inner end of the recess 81 has three spaced and stationary metal contacts 82, 83 and 84, and these contacts are positioned at locations that each correspond to a respective point of a not-illustrated equilateral triangle. The contacts 82-84 collectively serve as an electrical connector.

As mentioned earlier, the docking station 12 of FIG. 1 has an electrical connector with three vertically movable pins that are resiliently biased upwardly. As the stem 51 of the adapter 14 is inserted downwardly into the recess 26 of the docking station 12, the three contacts 82-84 on the stem 51 each move into engagement with the upper end of a respective one of the resiliently-biased pins. As the adapter 14 then continues to move downwardly to its fully-inserted position, the contacts each push the associated pin down a short distance against the resilient forces that urge the pins upwardly. This effects electrical coupling of the docking station 12 to the adapter 14.

Figure 4:
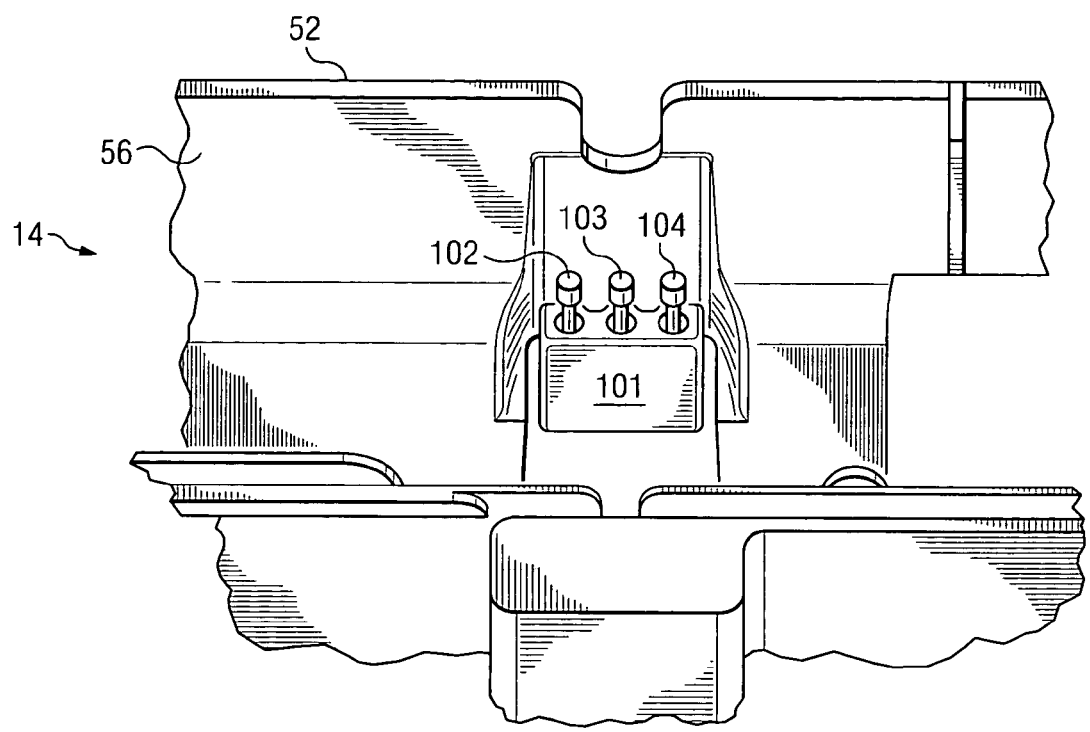
FIG. 4 is a diagrammatic fragmentary perspective view of a portion of a cross part of the docking station adapter.

FIG. 4 is a diagrammatic fragmentary perspective view of a portion of the cross part 52 of the adapter 14. The cross part 52 includes within the recess 56 a projection 101 that extends vertically upwardly from a bottom surface of the recess. Three electrical contacts are mounted in the projection 101, and each contact includes a vertically-movable pin 102, 103 or 104. The pins 102-104 are each biased resiliently upwardly by a respective spring that is not visible in FIG. 4. The pins 102-104 collectively serve as the previously-mentioned electrical connector that is provided within the recess 56.

Figure 5:
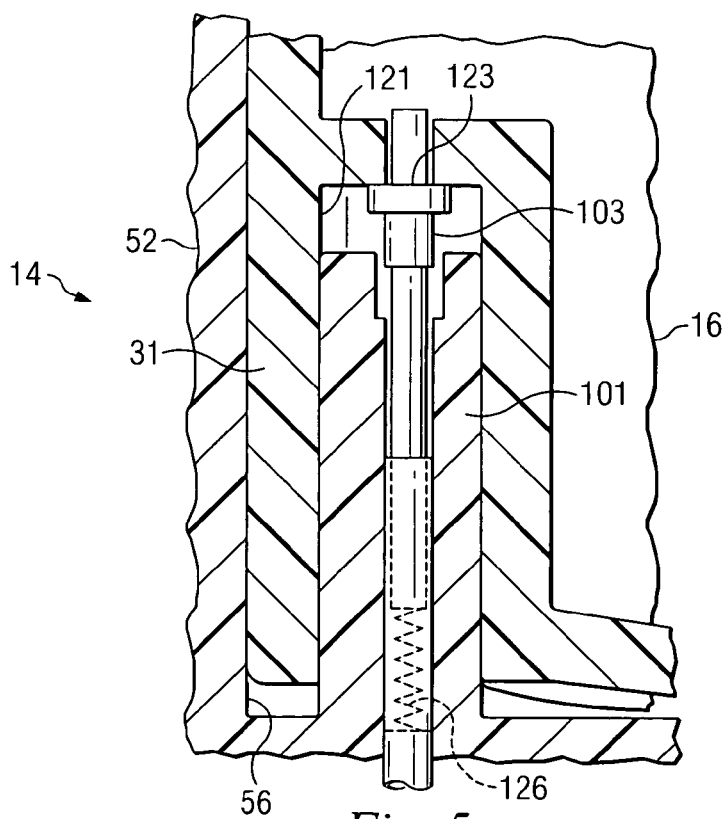
FIG. 5 is a diagrammatic fragmentary sectional view showing a portion of the cross part of the adapter, and a portion of a tag that is removably disposed within a recess of the cross part.

FIG. 5 is a diagrammatic fragmentary sectional view showing a portion of the cross part 52 of the adapter 14, and also showing a portion of the tag 16 when the tag is removably disposed within the recess 56. FIG. 5 shows that the portion 31 of the tag 16 has a recess 121 therein. Three spaced metal contacts are stationarily supported at the inner end of the recess 121, and one of these contacts is visible at 123. These contacts are similar to each other, and collectively serve as the previously-mentioned electrical connector that is present within the portion 31 of the tag 16. As shown in FIG. 5, the contact 123 has a flat round head that is disposed against an inner end surface of the recess 121, and has a shank or stem of smaller diameter that extends through an inner end wall of the recess 121.

FIG. 5 also shows at 126 a diagrammatic representation of a spring that biases the movable pin 103 in an upward direction. As the tag 16 is inserted into the recess 56 of the adapter 14, the contact 123 engages the upper end of the pin 103. As the tag 16 continues moving to its fully inserted position, the contact 123 forces the pin 103 to move down a small distance against the resilient urging of the spring 126. The spring 126 keeps the pin 103 in reliable mechanical and electrical engagement with the contact 123.

Figure 6:
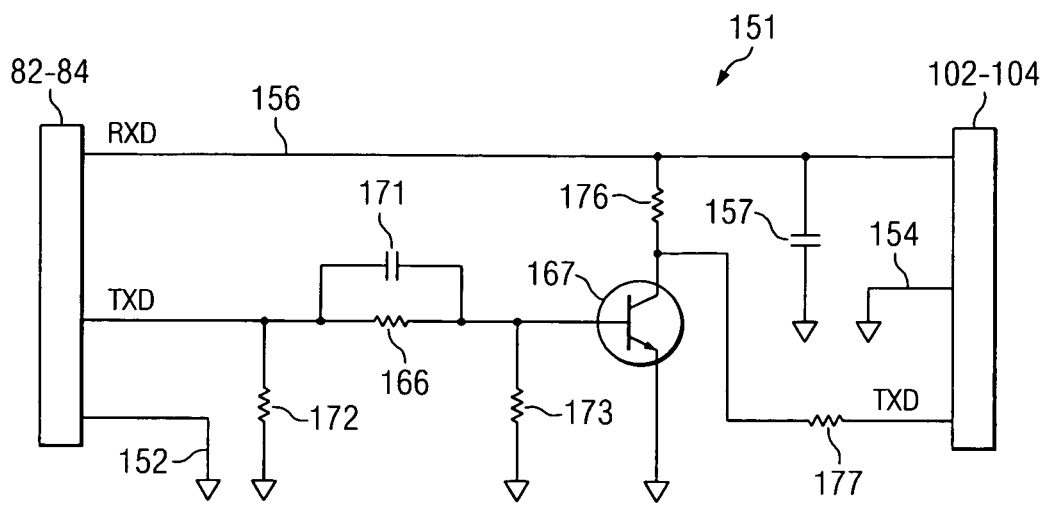
FIG. 6 is a schematic diagram of a circuit that is provided within the docking station adapter.

FIG. 6 is a schematic diagram of a circuit 151 that is provided within the adapter 14. The circuit 151 serves to electrically couple the two electrical connectors of the adapter 14, or in other words the electrical connector defined by the three contacts 82-84 (FIG. 3), and the electrical connector defined by the three pins 102-104 (FIG. 4). The circuitry in FIG. 6 handles signals for a serial interface that functions in a half duplex mode. In other words, at any given point in time, signals are traveling in one direction or the other, but never in both directions at the same time. The electrical connector defined by the contacts 82-84 is depicted at the left end of the schematic diagram in FIG. 6, and the electrical connector defined by the contacts 102-104 is depicted at the right end of the schematic diagram. Each of these connectors has one of its three contacts coupled to ground, as indicated at 152 and 154. An electrically conductive wire or line 156 directly couples another contact of each of these two connectors. The line 156 is coupled to ground through a decoupling capacitor 157.

The remaining contact of the electrical connector 82-84 is coupled through a resistor 166 to the base of a bipolar junction transistor (BJT) 167. A capacitor 171 is coupled in parallel with the resistor 166, and the ends of the resistor 166 are coupled to ground through respective resistors 172 and 173. The emitter of the transistor 167 is coupled to ground.

The collector of the transistor 167 is coupled through a resistor 176 to the line 156. The collector of the transistor 167 is also coupled through a resistor 177 to the remaining contact of the electrical connector 102-104.

In the disclosed embodiment, the resistor 172 has a value of 100K ohms, the resistor 166 has a value of 1K ohm, the capacitor 171 has a value of 1000 pF, the resistor 173 has a value of 33K ohms, the resistor 176 has a value of 20K ohms, the capacitor 157 has a value of 0.1 µF, and the resistor 177 has a value of 100 ohms. However, these specific values are exemplary. A variety of modifications can be made to the configuration of the circuit 151 and/or the values of its components, without departing from the scope of the present invention.

The resistors 172, 166, 173 and 176 facilitate biasing of the transistor 167. The capacitor 171 provides filtering, and also helps to increase the switching speed of the transistor 167. In particular, the transistor is driven into a saturated state during normal operation, and the capacitor helps to bring the transistor out of this saturated state relatively quickly. The transistor 167 and associated circuitry function to invert a signal that travels from the connector 82-84 to the connector 102-104.

As explained above, the signals passing through the circuit 151 are part of a serial interface that operates in half duplex mode. When signals are traveling from the connector 102-104 to the connector 82-84, they travel through the line 156. In this operational condition, the voltage carried by the line 156 changes state between two different values that respectively represent a binary "1" and a binary "0". On the other hand, when signals are traveling from the connector 82-84 to the connector 102-104 through the transistor 167, the line 156 is driven to a high-level voltage by the tag 16 and is maintained at that voltage, in order to effectively provide a supply voltage to the transistor 167 and associated circuitry, so that the transistor 167 can function as an inverter for signals traveling through it. In this operational condition, the transistor 167 and associated components are powered by the not-illustrated battery that is disposed within the tag 16. The resistor 176 is selected to have a relatively high value of 20K ohms, so that only a small amount of current is drawn from the battery in the tag 16, in order to prevent the circuit 151 of FIG. 6 from causing any significant discharge of the battery.

Figure 7:
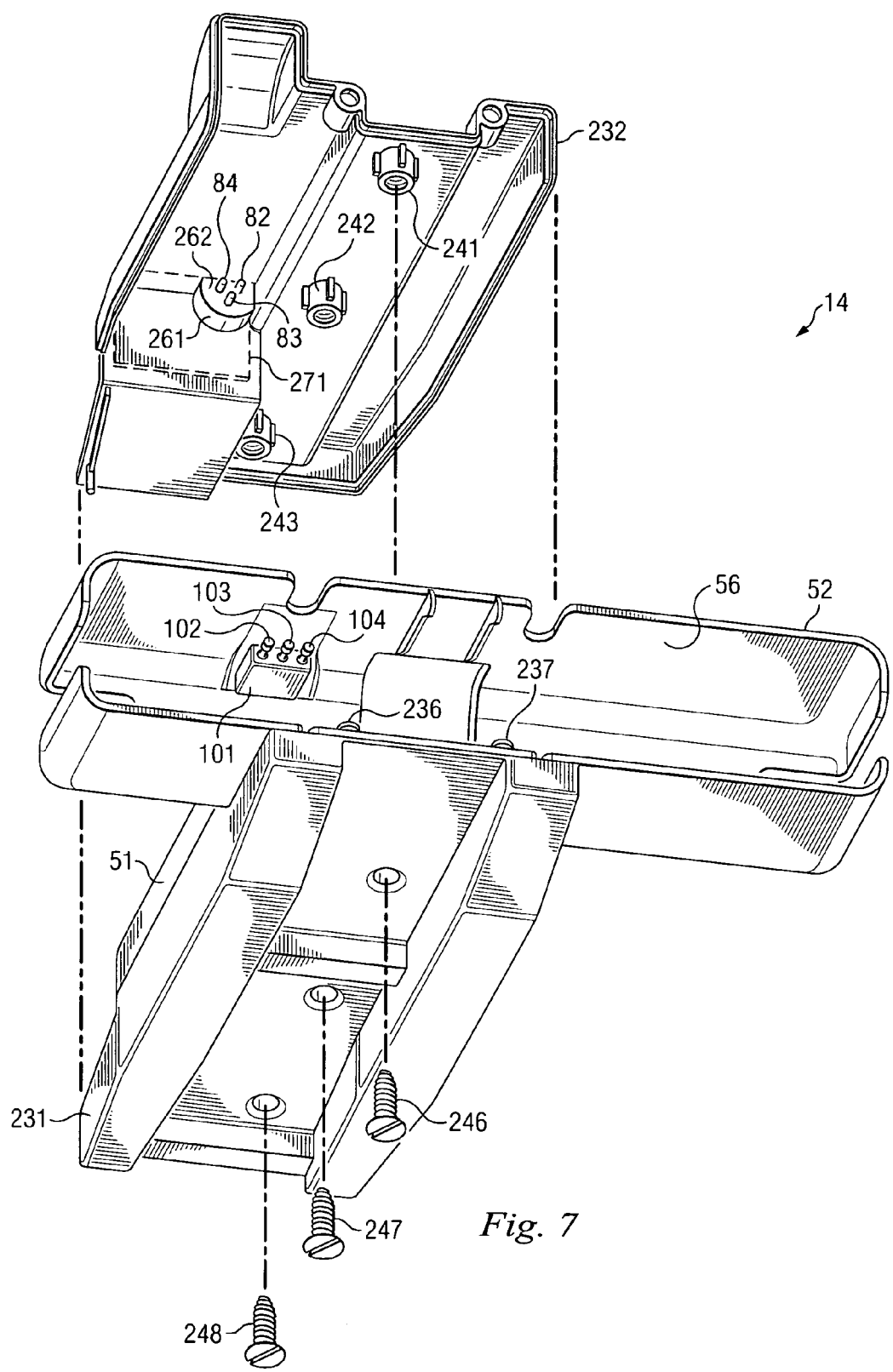
FIG. 7 is a diagrammatic exploded perspective view of the docking station adapter.

FIG. 7 is a diagrammatic exploded perspective view of the adapter 14. The stem 51 of the adapter includes two housing sections 231 and 232. The cross part 52 of the adapter is fixedly secured to the housing section 231 by screws, two of which are partially visible at 236 and 237. The inner side of the housing section 232 has three vertically spaced projections or bosses 241-243, and a respective metal insert with a threaded hole is secured in the center of each projection. Three screws 246-248 each extend through a respective opening in the housing section 231, and threadedly engage the hole in a respective one of the inserts in the projections 241-243, in order to fixedly secure the housing sections 231 and 232 to each other.

The housing section 232 has an integral cylindrical portion 261. The recess 81 (FIG. 3) extends into the cylindrical portion 261 from the exterior surface 78 of the housing section 232. The cylindrical portion 261 has a flat surface 262 at its upper end. The upper ends of the three contacts 82-84 project upwardly beyond the flat surface 262.

The circuit 151 of FIG. 6 is provided on a printed circuit board 271 which, for clarity, is indicated diagrammatically by broken lines in FIG. 7. A corner portion of the circuit board 271 has one side disposed against the surface 262. The upper ends of the contacts 82-84 each extend through respective holes provided in the circuit board 271, and are each soldered to the circuit board 271. The circuit board 271 is fixedly held in position by its engagement with the surface 262, and by the fact that it is soldered to each of the contacts 82-84.

Figure 8:
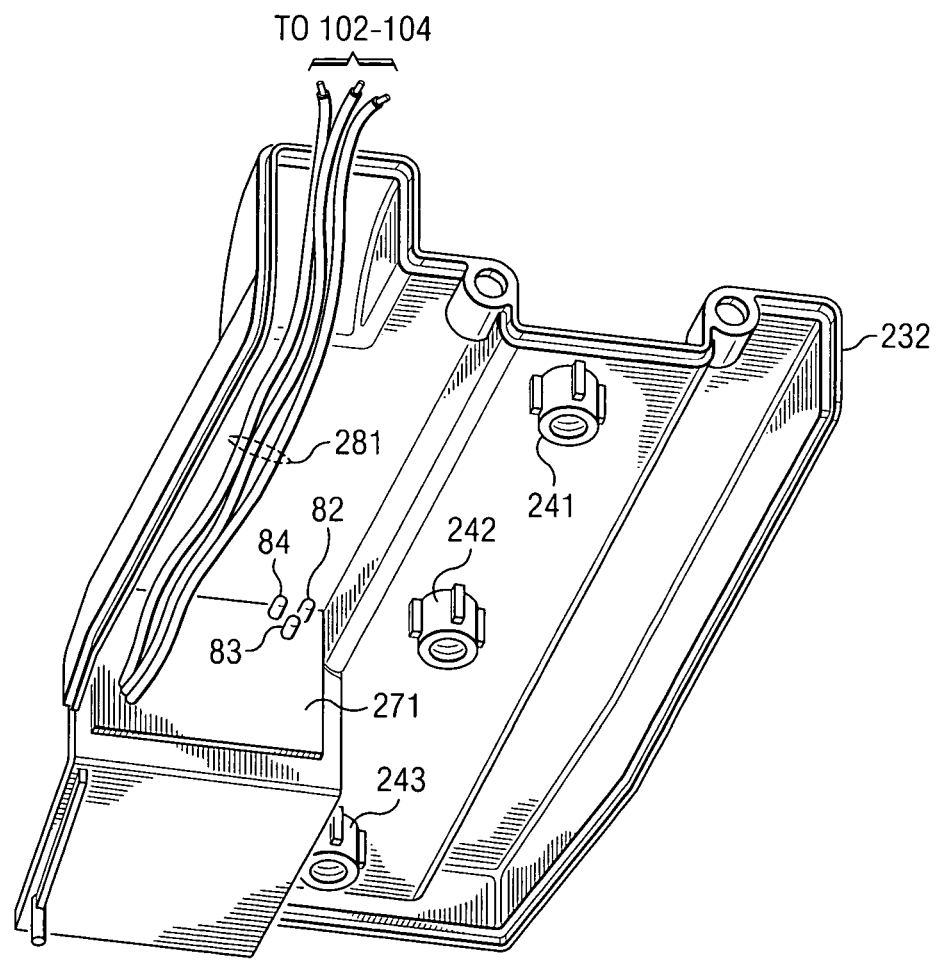
FIG. 8 is a diagrammatic perspective view of a housing section of the adapter, in an enlarged scale.

FIG. 8 is a diagrammatic perspective view showing the housing section 232 in an enlarged scale, and also showing the circuit board 271 in solid lines. Reference numeral 281 collectively designates three wires that each have one end soldered to the circuit board 271. The other end of each of the three wires 281 is soldered to a respective one of the three pins 102-104 that serve as the electrical connector within the recess 56 of the adapter 14.

Although one selected embodiment has been illustrated and described in detail, it should be understood that various substitutions and alterations are possible without departing from the spirit and scope of the present invention, as defined by the following claims. Moreover, to the extent that the foregoing description uses directional terms such as top, bottom, side, inner and outer, these terms are used only for convenience in relation to how the disclosed structure is oriented in the drawings, and should not be considered to be limiting as to the scope of protection.

What is claimed is:

1. An apparatus comprising an adapter having:
   a cradle portion that can removably receive a radio frequency identification tag;
   a first electrical connector positioned in said cradle portion so that, when a tag is removably received in said cradle portion, said first electrical connector electrically couples said adapter to the tag;
   a second electrical connector disposed on said adapter at a location spaced from said cradle portion, said second electrical connector having only three contacts, and said contacts being positioned at locations that each correspond to a respective point of an equilateral triangle; and
   structure electrically coupling said first and second electrical connectors.

2. An apparatus comprising an adapter having:
   spaced electrical first and second connectors, said first connector having a configuration compatible with a radio frequency identification tag connector, and said second connector having only three contacts, said contacts being positioned at locations that each correspond to a respective point of an equilateral triangle; and
   structure electrically coupling said first and second connectors.

3. An apparatus according to claim 2, wherein said adapter includes a cradle portion that can removably receive a radio frequency identification tag, said first connector being positioned in said cradle portion so that, when a tag is removably received in said cradle portion, said first connector electrically couples said adapter to the tag, said second connector being disposed on said adapter at a location spaced from said cradle portion.

4. An apparatus according to claim 3, wherein said structure includes circuitry that is electrically coupled between said first and second connectors, and that is disposed within said adapter.

5. An apparatus according to claim 4,
   wherein said structure includes a circuit board that is disposed within said adapter and that has said circuitry thereon; and wherein one of said first and second connectors has a plurality of contacts with end portions that extend through and are soldered to said circuit board.

6. An apparatus according to claim 4, wherein said circuitry includes a portion that inverts an electrical signal traveling from one of said first and second connectors to the other thereof.

7. An apparatus according to claim 4,
wherein said circuitry includes: a first signal path for first signals traveling from said second connector to said first connector;
a second signal path for second signals traveling from said first connector to said second connector; and
a circuit portion that influences the second signals traveling along said second signal path, said circuit portion receiving operating power from said second connector through said first signal path.

8. An apparatus according to claim 3, wherein said first connector has a plurality of contacts that each include a resiliently biased pin.

9. An apparatus according to claim 8, wherein said cradle portion of said adapter has a tag receiving recess and has a projection within said recess, said resiliently biased pins being located near an outer end of said projection.

10. An apparatus according to claim 3, wherein said first connector has a plurality of contacts arranged in a configuration different from the configuration of said contacts of said second connector.

11. An apparatus according to claim 3, wherein said adapter is approximately T-shaped, has a cross part with a center portion, and has a stem that projects transversely outwardly from said center portion of said cross part, said cross part including said cradle portion, and said second connector being located on said stem at a location spaced from said cross part.

12. An apparatus according to claim 11, including a tag docking station having a recess that can removably receive said stem of said adapter, said tag docking station having within said recess an electrical third connector that electrically engages said second connector when said stem of said adapter is removably disposed in said recess.

13. An apparatus according to claim 2, wherein said structure electrically coupling said connectors includes circuitry that is electrically coupled to said contacts of said second connector, and that is configured to communicate through said second connector according to a half duplex protocol.

14. An apparatus according to claim 13, wherein said circuitry includes:

a first signal path for first signals traveling from said second connector to said first connector;
a second signal path for second signals traveling from said first connector to said second connector; and
a circuit portion that influences the second signals traveling along said second signal path, said circuit portion receiving operating power from said second connector through said first signal path.

15. An apparatus according to claim 13, wherein said first connector has three contacts, and wherein said circuitry includes:
a first said contact of each of said first and second connectors being coupled to ground;
a second said contact of said first connector being connected to a second said contact of said second connector;
a first capacitor coupled between ground and said second contact of said second connector;
a first resistor coupled between ground and a third said contact of said first connector;
second and third resistors coupled in series with each other between ground and said third contact of said first connector, with said second resistor between said third resistor and said third contact of said first connector;
a second capacitor coupled in parallel with said second resistor;
a fourth resistor and a transistor coupled in series with each other between ground and said second contact of said second connector, with said fourth resistor between said transistor and said second contact of said second connector; and
a fifth resistor having one end coupled to a node between said transistor and said fourth resistor, and having another end coupled to a third of said contacts of said second connector.

16. An apparatus according to claim 2, wherein an exterior surface of said adapter has an approximately cylindrical recess therein, said contacts of said second connector being disposed at an inner end of said recess.

17. An apparatus according to claim 2, wherein said adapter has a stem that extends approximately parallel to a direction and has an outer end, said second connector being disposed on said stem at a location spaced in said direction from said outer end of said stem.

* * * * *